(12) United States Patent
Kawano (10) Patent No.: US 9,217,975 B2
(45) Date of Patent: Dec. 22, 2015

(54) OPTICAL SCANNING DEVICE, IMAGE FORMING APPARATUS WITH OPTICAL SCANNING DEVICE AND ABNORMALITY DETECTION METHOD FOR OPTICAL SCANNING DEVICE

(71) Applicant: KYOCERA Document Solutions Inc., Osaka-shi, Osaka (JP)

(72) Inventor: Daichi Kawano, Osaka (JP)

(73) Assignee: KYOCERA Document Solutions Inc. (JP)

( * ) Notice: Subject to any disclaimer, the term of this patent is extended or adjusted under 35 U.S.C. 154(b) by 353 days.

(21) Appl. No.: 13/678,912

(22) Filed: Nov. 16, 2012

(65) Prior Publication Data

US 2013/0135420 A1    May 30, 2013

(30) Foreign Application Priority Data

Nov. 29, 2011   (JP) .................................. 2011-260067

(51) Int. Cl.
| | |
|---|---|
| *G02B 26/12* | (2006.01) |
| *B41J 2/44* | (2006.01) |
| *G03G 15/04* | (2006.01) |
| *G03G 15/00* | (2006.01) |
| *G02B 26/10* | (2006.01) |

(52) U.S. Cl.
CPC .............. *G03G 15/553* (2013.01); *B41J 2/442* (2013.01); *G02B 26/10* (2013.01); *G02B 26/124* (2013.01); *G02B 26/127* (2013.01); *G03G 15/04072* (2013.01); *G03G 15/502* (2013.01)

(58) Field of Classification Search
CPC .............. B41J 2/442; B41J 2/45; B41J 2/455; B41J 2/473
USPC .................................................... 347/133, 246
See application file for complete search history.

(56) References Cited

U.S. PATENT DOCUMENTS

| | | | | |
|---|---|---|---|---|
| 4,729,038 A * | 3/1988 | Miura et al. | ................... | 358/300 |
| 5,140,157 A * | 8/1992 | Ohshima et al. | ............... | 250/235 |
| 5,745,154 A * | 4/1998 | Nishizawa | ................ | 347/250 |
| 7,048,286 B2 | 5/2006 | Eppelein | | |
| 2003/0117483 A1 * | 6/2003 | Ishikawa et al. | ............... | 347/236 |
| 2006/0049344 A1 * | 3/2006 | Kasai | ............... | 250/234 |
| 2012/0007933 A1 * | 1/2012 | Yamashita | .................... | 347/118 |

FOREIGN PATENT DOCUMENTS

JP            2005-10267         1/2005

* cited by examiner

*Primary Examiner* — Kristal Feggins
*Assistant Examiner* — Kendrick Liu
(74) *Attorney, Agent, or Firm* — Gerald E. Hespos; Michael J. Porco; Matthew T. Hespos (57) ABSTRACT

An optical scanning device includes a light emitter, a scanner, a first detector and a determiner. The light emitter outputs a beam. The scanner scans within a given area determined in advance with the beam output from the light emitter. The first detector is arranged on an optical path of the beam in the given area and detects the light quantity of the beam. The determiner determines light quantity shortage of the light beam if the light quantity detected by the first detector is below a first threshold set in advance and above a second threshold indicating a light quantity smaller than the first threshold and determines an abnormality in a scanning operation by the scanner or an abnormality of the light emitter if the light quantity detected by the first detector is below the second threshold.

2 Claims, 7 Drawing Sheets

| BEAM DETECTION SIGNAL BD | LIGHT QUANTITY DETECTION SIGNAL SV | MONITOR VOLTAGE SIGNAL MON | DETERMINATION |
|---|---|---|---|
| L | X | X | NORMAL OPERATION |
| H | H | H | LIGHT QUANTITY SHORTAGE (ERROR) |
| H | L | H | OPTICAL AXIS MISALIGNMENT (ERROR) |
| X | X | L | LASER ABNORMALITY (ERROR) |

OPTICAL SCANNING DEVICE, IMAGE FORMING APPARATUS WITH OPTICAL SCANNING DEVICE AND ABNORMALITY DETECTION METHOD FOR OPTICAL SCANNING DEVICE

This application is based on Japanese Patent Application Serial No. 2011-260067 filed with the Japan Patent Office on Nov. 29, 2011, the contents of which are hereby incorporated by reference.

BACKGROUND

The present disclosure relates to an optical scanning device, an image forming apparatus using this optical scanning device and an abnormality detection method for optical scanning device.

There is known an image forming apparatus for forming an image by deflecting a light beam irradiated from a semiconductor laser by a polygon mirror to scan a photoconductive drum and forming an electrostatic latent image on the circumferential surface of the photoconductive drum. There is also known a technology for introducing a part of a light beam output from such a semiconductor laser to a photodiode by a half mirror, detecting the light quantity of the light beam by the photodiode and displaying a message notifying that the semiconductor has failed if the detected light quantity is below a specified value.

However, in the above technology, the presence or absence of a failure is determined based on whether or not the light quantity of the light beam exceeds the specified value. Thus, even if a failure was judged, it could not be discriminated whether the cause of the failure was because the semiconductor had emitted no light at all or because the light quantity had decreased due to deterioration. Further, in the above technology, the light beam is introduced to the photodiode by the half mirror provided between the semiconductor laser and the polygon mirror. Thus, there has been an inconvenience that an abnormality in a scanning operation such as a misalignment of a scanning position of the light beam reflected by the polygon mirror cannot be detected although a failure of the semiconductor laser can be detected, An object of the present disclosure is to provide an optical scanning device capable of determining the content of an abnormality having occurred in an optical scanning device in more detail, an image forming apparatus using this and an abnormality detection method for optical scanning device.

SUMMARY

An optical scanning device according to one aspect of the present disclosure includes a light emitter, a scanner, a first detector and a determiner. The light emitter outputs a beam. The scanner scans within a given area determined in advance with the beam output from the light emitter. The first detector is arranged on an optical path of the beam in the given area and detects the light quantity of the beam. The determiner determines light quantity shortage of the beam if the light quantity detected by the first detector is below a first threshold set in advance and above a second threshold indicating a light quantity smaller than the first threshold and determines an abnormality in a scanning operation by the scanner or an abnormality of the light emitter if the light quantity detected by the first detector is below the second threshold.

An image forming apparatus according to another aspect of the present disclosure includes the above optical scanning device, a photoconductor, an imager and a notifier. The photoconductor is arranged in the given area and scanned by the beam to form an electrostatic latent image. The imager forms an image on a sheet based on the electrostatic latent image formed on the photoconductor. The notifier notifies a determination result by the determiner.

An abnormality detection method according to still another aspect of the present disclosure is for an optical scanning device including a light emitter, a scanner and a first detector. The light emitter outputs a beam. The scanner scans within a given area determined in advance with the beam output from the light emitter. The first detector is arranged on an optical path of the beam in the given area and detects the light quantity of the beam. The abnormality detection method for the optical scanning device determines light quantity shortage of the beam if the light quantity detected by the first detector is below a first threshold set in advance and above a second threshold indicating a light quantity smaller than the first threshold and determines an abnormality in a scanning operation by the scanner or an abnormality of the light emitter if the light quantity detected by the first detector is below the second threshold.

These and other objects, features and advantages of the present disclosure will become more apparent upon reading the following detailed description along with the accompanying drawings.

DETAILED DESCRIPTION

Figure 1:
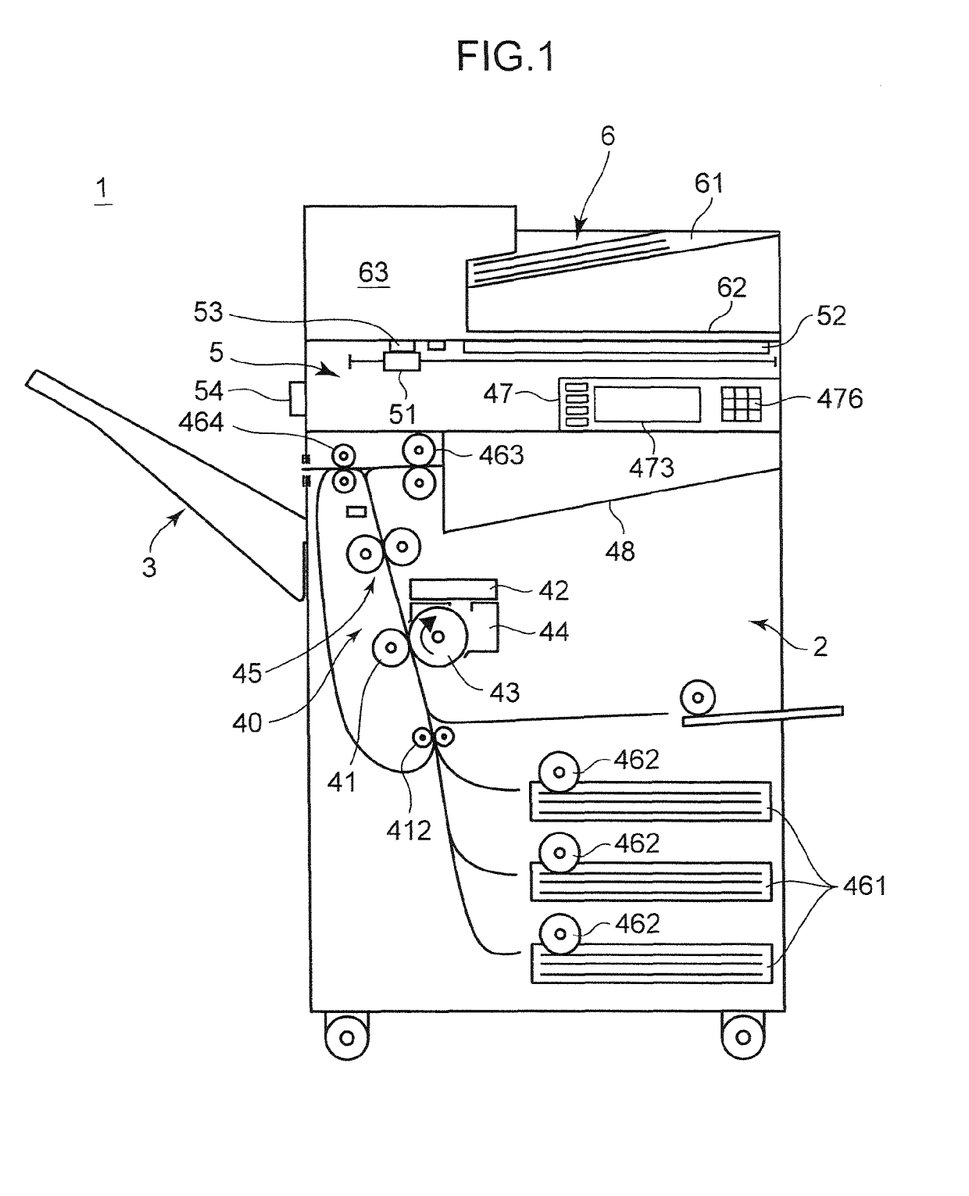
FIG. 1 is a configuration diagram schematically showing the internal configuration of a copier as an example of an image forming apparatus with an optical scanning device according to one embodiment of the present disclosure.
Figure 2:
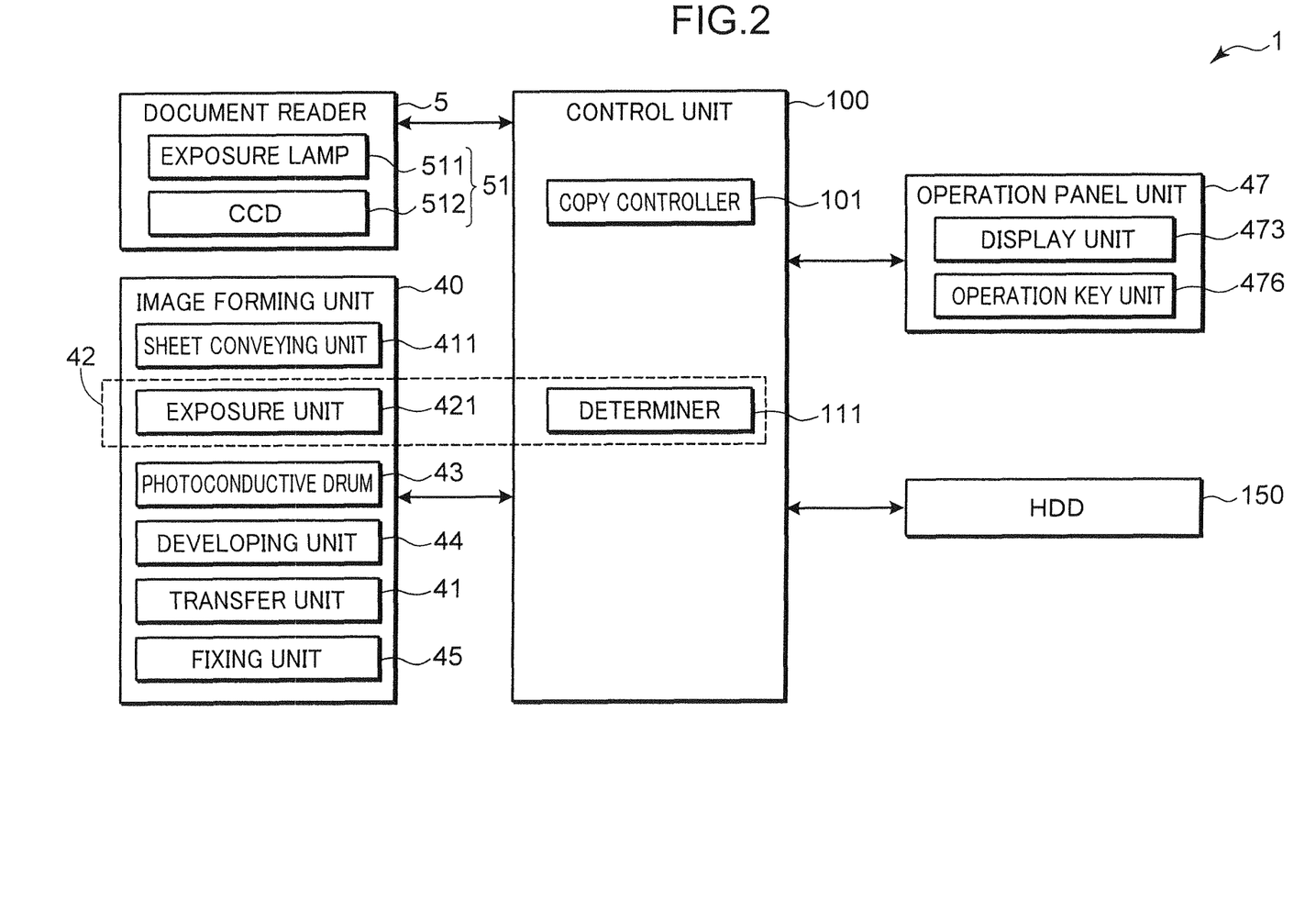
FIG. 2 is a block diagram showing an example of the electrical configuration of the copier shown in FIG. 1.

Hereinafter, an embodiment according to the present disclosure is described based on the drawings. Note that constituent elements denoted by the same reference signs in the respective drawings are the same constituent elements and not repeatedly described. FIG. 1 is a configuration diagram schematically showing the internal configuration of a copier 1 as an example of an image forming apparatus with an optical scanning device 42 according to one embodiment of the present disclosure. FIG. 2 is a block diagram showing an example of the electrical configuration of the copier 1 shown in FIG. 1. Note that the image forming apparatus is not limited to the copier and may be a printer, a facsimile machine, a complex machine provided with these functions or the like.

The copier 1 includes a main assembly 2, a stack tray 3 arranged on the left side of the main assembly 2, a document reader 5 arranged atop the main assembly 2 and a document feeder 6 arranged atop the document reader 5.

A substantially rectangular operation panel unit 47 is provided on a front part of the copier 1. The operation panel unit 47 includes a display unit 473 (notifier) and an operation key unit 476. The display unit 473 is composed of a liquid crystal display having a touch panel function and the like.

The document reader 5 includes a document scanner unit 51 composed of a CCD (Charge Coupled Device) 512, an exposure lamp 511 and the like, a document platen 52 made of a transparent material such as glass, and a document reading slit 53. The document scanner unit 51 is configured to be movable by an unillustrated driver. In reading a document placed on the document platen 52, the document scanner unit 51 moves along a document surface at a position facing the document platen 52 and outputs obtained image data to a control unit 100 while scanning a document image. Further, in reading a document fed by the document feeder 6, the document scanner unit 51 moves to a position facing the document reading slit 53, obtains an image of a document in synchronization with a document conveying operation by the document feeder 6 via the document reading slit 53, and outputs image data of the document image to the control unit 100.

A power switch 54 is arranged on a side surface of the document reader 5.

The document feeder 6 includes a document placing portion 61 on which a document is to be placed, a document discharging portion 62 to which a document having an image read is to be discharged, and a document conveying mechanism 63 for feeding documents placed on the document placing portion 61 one by one, conveying the documents to a position facing the document reading slit 53 and discharging the documents to the document discharging portion 62.

The main assembly 2 includes a plurality of sheet cassettes 461, feed rollers 462 for feeding sheets one by one from the sheet cassettes 461 and conveying them to an image forming unit 40, the image forming unit 40 for forming an image on a sheet conveyed from the sheet cassette 461, and the control unit 100 responsible for an operation control of the entire apparatus.

The image forming unit 40 includes a sheet conveying unit 411, an exposure unit 421, a photoconductive drum 43 (photoconductor), a developing unit 44 (imager), a transfer unit (imager) and a fixing unit 45 (imager). The sheet conveying unit 411 includes conveyor rollers 412 for feeding a sheet conveyed by the feed roller 462 to the photoconductive drum 43, conveyor rollers 463, 464 for conveying the sheet to the stack tray 3 or a discharge tray 48 and the like, the conveyor rollers 412, 463 and 464 being provided at intermediate positions of a sheet conveyance path in the image forming unit 40.

In this case, the developing unit 44, the transfer unit and the fixing unit 45 constitute the imager and the photoconductive drum 43 constitutes the photoconductor.

The exposure unit 421 outputs a laser beam or the like based on image data output from the control unit 100 to expose the photoconductive drum 43 to light, thereby forming an electrostatic latent image on the photoconductive drum 43. The developing unit forms a toner image by developing the electrostatic latent image on the photoconductive drum 43 with a toner. The transfer unit 41 transfers the toner image on the photoconductive drum 43 to a sheet. The fixing unit 45 fixes the toner image to the sheet by heating the sheet having the toner image transferred thereto.

The control unit 100 includes a CPU (Central Processing Unit) for performing a predetermined arithmetic processing, a ROM (Read Only Memory) storing a predetermined control program, a RAM (Random Access Memory) for temporarily storing data, peripheral circuits of these and the like. The document reader 5, the image forming unit 40, the operation panel unit 47 and a HDD (Hard Disk Drive) 150 are connected to the control unit 100.

The control unit 100 fulfills functions of a copy controller 101 and a determiner 111 by executing a control program stored in the ROM, the HDD 150 or the like. The exposure unit 421 and the determiner 111 constitute the optical scanning device 42. Note that the control unit 100 for controlling the entire image forming apparatus fulfills the function of the determiner 111 of the optical scanning device 42 in an example shown in FIG. 2. However, the determiner 111 may be provided separately from the control unit 100.

When the power switch 54 shown in FIG. 1 is turned on, a power supply voltage generated by an unillustrated power supply circuit is supplied to each component in the copier 1 and the control unit 100 starts operating, whereby the copier 1 is started.

The copy controller 101 copies a document image by controlling the operation of the respective copy-related components in the image forming apparatus. Specifically, the copy controller 101 transmits image data read from a document by the document reader 5 to the image forming unit 40 and causes the image forming unit 40 to form an image of the document.

The determiner 111 determines the content of an abnormality having occurred in the exposure unit 421 and causes the display unit 473 to display a determination result. In this case, the display unit 473 constitutes the notifier.

Figure 3:
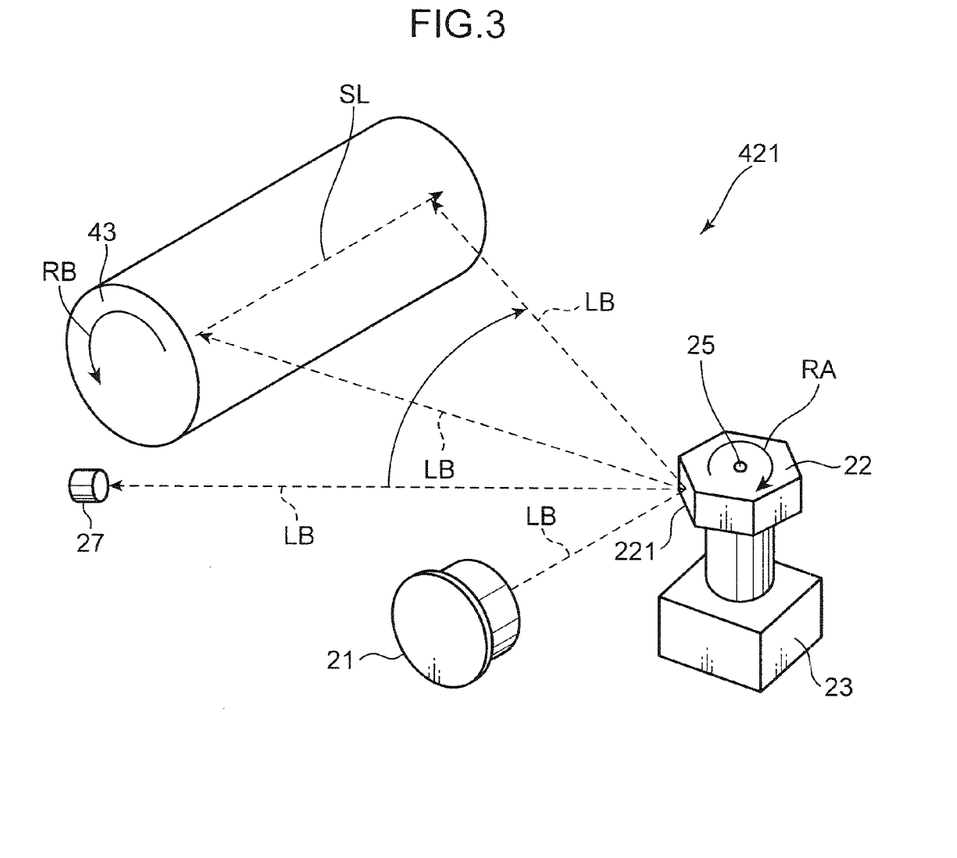
FIG. 3 is a perspective view conceptually showing the configuration of an exposure unit and a photoconductive drum.

FIG. 3 is a perspective view conceptually showing the configurations of the exposure unit 421 and the photoconductive drum 43. FIG. 3 shows a state where the photoconductive drum 43 is scanned with a laser beam by the exposure unit 421. The exposure unit 421 shown in FIG. 3 includes a laser unit 21, a polygon mirror 22 (scanner), a polygon motor 23 and a photosensor 27. Note that optical members such as an Fθ lens may be arranged between the polygon mirror 22 and the photoconductive drum 43 and the scanner may include these optical members. Although the polygon mirror constitutes the scanner in the shown example, the scanner may be, for example, a MEMS (Micro Electro Mechanical System) mirror.

The laser unit 21 emits a laser beam LB to the polygon mirror 22. The laser unit 21 is configured such that a laser light source such as a laser diode for emitting a laser beam LB and a photosensor such as a photodiode for detecting the light quantity of the laser light source are arranged in one package.

The polygon mirror 22 is a regular hexagonal polygon mirror and includes six light deflecting surfaces 221 on a side surface thereof. The polygon mirror 22 is rotated in a rotating direction RA about a rotary shaft 25 by the polygon motor 23. Thus, a laser beam LB emitted from the laser unit 21 is reflected by the light deflecting surface 221 of the polygon mirror 22 and an angle of reflection changes according to the rotation of the polygon mirror 22. As a result, the laser beam LB scans within a specific area including the circumferential surface of the photoconductive drum 43 in a main scanning direction. In this way, an electrostatic latent image corresponding to a scan line SL is formed on the photoconductive drum 43.

An electrostatic latent image corresponding to one scan line SL is formed by one light deflecting surface 221. Every time the light deflecting surface 22 for reflecting the laser beam LB is switched according to the rotation of the polygon mirror 22, an electrostatic latent image is formed on the photoconductive drum in conformity with a new scan line SL. In this way, the polygon mirror 22 repeatedly scans the circumferential surface of the photoconductive drum 43 with the laser beam LB along the main scanning direction in a given scanning cycle set in advance. On the other hand, the photoconductive drum 43 is rotated in a rotating direction RB, whereby an electrostatic latent image in conformity with a plurality of scan lines SL is formed in the sub scanning direction.

The photosensor 27 is arranged on an optical path of the laser beam LB near an end part of the photoconductive drum 43 at a start side of the scan line SL. The photosensor 27 outputs a low-level beam detection signal BD to the copy controller 101 and the determiner 111 when receiving the laser beam LB.

The copy controller 101 outputs a control signal for the output of scan lines SL representing image data to be imaged to the laser unit 21 in synchronization with the beam detection signal BD. This causes the copy controller 101 to synchronize the image to be imaged and the scan lines SL so that the scan lines SL are correctly drawn.

Figure 4:
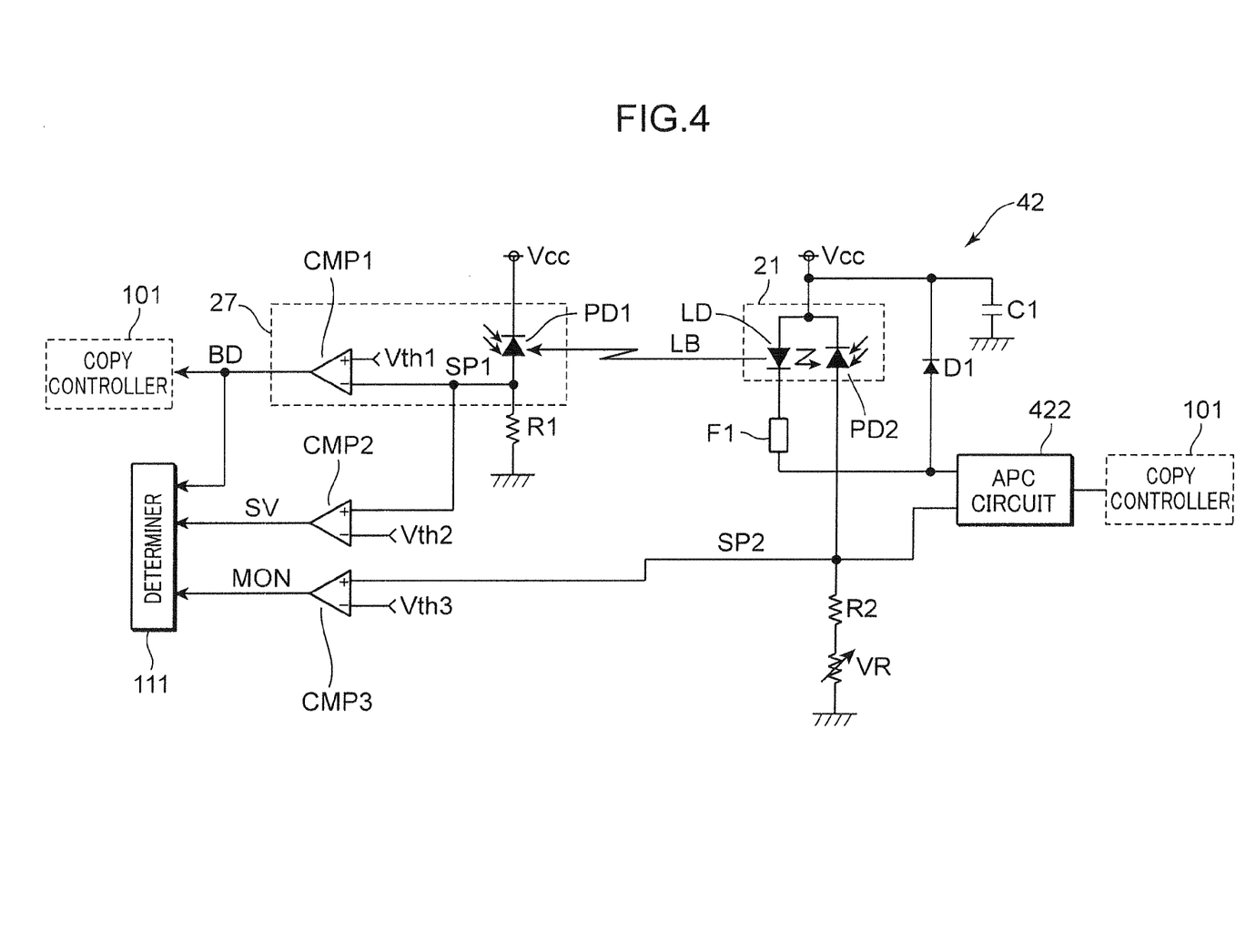
FIG. 4 is a circuit diagram showing an example of the configuration of the optical scanning device.

FIG. 4 is a circuit diagram showing an example of the configuration of the optical scanning device 42. The optical scanning device 42 shown in FIG. 4 includes a laser diode LD (light emitter), a photodiode PD1 (first detector), a photodiode PD2 (second detector), comparators CMP1, CMP2 and CMP3, resistors R1, R2, a variable resistor VR, a ferrite bead F1, a diode D1, a capacitor C1, an APC (Automatic Power Control) circuit 422 and the determiner 111. The polygon motor 23 is not shown in FIG. 4.

The laser diode LD and the photodiode PD2 are proximately arranged in the laser unit 21 and enclosed in the same package. The laser diode LD is, for example, an edge emitting laser. The laser diode LD outputs a laser beam LB from the front surface and outputs a back beam (another beam) in a direction opposite to the laser beam LB. The laser beam LB is emitted from the front surface of the laser diode LD toward the polygon mirror 22 and the so-called back beam emitted from the opposite side of the laser diode LD is irradiated to the photodiode PD2. Since the light quantity of the laser beam LB and that of the back beam are correlated and the light quantity of the back beam changes according to a change in the light quantity of the laser beam LB, the photodiode PD2 indirectly detects the light quantity of the laser beam LB by detecting the light quantity of the back beam.

Note that although the laser diode LD constitutes the light emitter in the above example, the light emitter only has to output a beam and is not limited to a laser diode. Further, although the photodiode PD2 constitutes the second detector in the above example, the second detector only has to be able to detect the light quantity of the laser beam and is not limited to a photodiode. Further, although the photodiode PD2 detects the light quantity of the back beam of the laser diode LD in the above example, the photodiode PD2 may be configured to directly detect the light quantity of the laser beam LB between the laser diode LD and the polygon mirror 22. The photodiode PD2 may be, for example, configured to detect the light quantity of a laser beam reflected by a half mirror provided on the optical path between the laser diode LD and the polygon mirror 22 as information indicating the light quantity of the laser beam LB.

However, in the case of arranging the half mirror between the laser diode LD and the polygon mirror 22 and detecting a laser beam reflected by the half mirror by the photodiode PD2 (second detector), the light quantity of the laser beam LB scanning the circumferential surface of the photoconductive drum 43 decreases. On the other hand, the configuration for indirectly detecting the light quantity of the laser beam LB by detecting the light quantity of the back beam (another beam) by the photodiode PD2 (second detector) is more preferable since the light quantity of the laser beam LB scanning the circumferential surface of the photoconductive drum 43 does not decrease.

Next, the circuit configuration of the optical scanning device 42 is described in detail. An anode of the laser diode LD is connected to a power supply Vcc, and a cathode thereof is connected to the APC circuit 422 via the ferrite bead F1. A cathode of the photodiode PD2 is connected to the power supply Vcc and an anode thereof is connected to a circuit ground via the resistor R2 and the variable resistor VR.

A cathode of the diode D1 is connected to the power supply Vcc and an anode thereof is connected to a connection point between the ferrite bead F1 and the APC circuit 422. The diode D1 is a protection circuit for protecting the laser diode LD from a reverse voltage. The capacitor C1 is connected between the power supply Vcc and the circuit ground. The capacitor C1 is a so-called bypass condenser. The capacitor C1 stabilizes a power supply voltage supplied to the laser diode LD and the photodiode PD2. The ferrite bead F1 is a protection circuit for protecting the laser diode LD from static electricity.

When the photodiode PD2 is irradiated with a laser beam, a current corresponding to the light quantity of the laser beam flows in a series circuit composed of the resistor R2 and the variable resistor VR. The current flowing in that series circuit is converted into a voltage by a series resistor formed by the resistor R2 and the variable resistor VR. As a result, a voltage at a connection point between the anode of the photodiode PD2 and the resistor R2 is obtained as a second detection signal SP2 indicating the light quantity of the laser beam LB. The second detection signal SP2 is input to the APC circuit 422 and a plus terminal of the comparator CMP3.

Since a relationship between the light quantity of the laser beam LB (light quantity of the back beam) and a voltage value of the second detection signal SP2 changes due to a characteristic variation of the photodiode PD2 and a resistance variation of the resistor R2, the influence of these variations can be canceled by adjusting the variable resistor VR.

A third threshold voltage Vth3 (third threshold) is input to a minus terminal of the comparator CMP3. A voltage which serves as a basis for determination as to whether or not the laser diode LD has emitted light is set as the third threshold voltage Vth3.

The comparator CMP3 compares the second detection signal SP2 and the third threshold voltage Vth3 and outputs a monitor voltage signal MON indicating a comparison result to the determiner 111. The comparator CMP3 sets the monitor voltage signal MON to high-level (H) to indicate the light emission of the laser diode LD when the second detection signal SP2 exceeds the third threshold voltage Vth3 and sets the monitor voltage signal MON to low-level (L) to indicate an off-state of the laser diode LD when the second detection signal SP2 falls below a second threshold voltage Vth2.

Note that since the comparator CMP3 only has to be able to determine whether or not the laser diode LD has emitted light and highly accurate voltage determination is not necessary, a buffer circuit may be, for example, used as the comparator CMP3. In this case, a threshold level of the buffer circuit is equivalent to the third threshold.

The photosensor 27 is a photo IC formed by integrating the photodiode PD1 and the comparator CMP1 into one package. For example, a photo IC or a pin photodiode is used as the photodiode PD1.

A cathode of the photodiode PD1 is connected to the power supply Vcc and an anode thereof is connected to the circuit ground via the resistor R1. This causes a current corresponding to the light quantity of a laser beam to flow into the resistor R1 when the photodiode PD1 is irradiated with the laser beam, and the flowing current is converted into a voltage by the resistor R1. As a result, a voltage at a connection point between the anode of the photodiode PD1 and the resistor R1 is obtained as a first detection signal SP1 indicating the light quantity of the laser beam LB after being reflected by the polygon mirror 22. The first detection signal SP1 is input to a minus terminal of the comparator CMP1 and a plus terminal of the comparator CMP2.

A first threshold voltage Vth (first threshold) is input to a plus terminal of the comparator CMP1. The first threshold voltage Vth1 is a reference voltage for determination as to whether or not the laser beam LB has been detected. The comparator CMP1 compares the first detection signal SP1 and the first threshold voltage Vth1 and outputs a beam detection signal BD indicating a comparison result to the copy controller 101 and the determiner 111. The first, second and third threshold voltages Vth1, Vth2 and Vth3 are generated by an unillustrated voltage generation circuit such as a voltage dividing resistor or a constant-voltage circuit.

The comparator CMP1 sets the beam detection signal BD to low-level (L) when the first detection signal SP1 exceeds the first threshold voltage Vth1 and sets the beam detection signal BD to high-level (H) when the first detection signal SP1 falls below the first threshold voltage Vth1. Specifically, the beam detection signal BD indicates the detection of the laser beam LB by the photosensor 27 when being at low-level.

The second threshold voltage Vth2 (second threshold) is input to a minus terminal of the comparator CMP2. A voltage which can be obtained as the first detection signal SP1 by the photodiode PD1 even if the laser beam LB has a small light quantity as long as the laser beam LB is received by the photosensor 27 is set as the second threshold voltage Vth2. Specifically, the second threshold voltage Vth2 is set at a voltage lower than the first threshold voltage Vth1 (signal indicating a small light quantity) and, for example, set at a voltage (light quantity) which is substantially ⅓ of the first threshold voltage Vth1.

The comparator CMP2 compares the first detection signal SP1 and the second threshold voltage Vth2 and outputs a light quantity detection signal SV indicating a comparison result to the determiner 111. The comparator CMP2 sets the light quantity detection signal SV to high-level (H) when the first detection signal SP1 exceeds the second threshold voltage Vth2 and sets the light quantity detection signal SV to low-level (L) when the first detection signal SP1 falls below the second threshold voltage Vth2.

The APC circuit 422 turns on or off the laser diode LD by controlling a drive current, which flows into the laser diode LD, in accordance with a control signal from the copy controller 101. Further, the APC circuit 422 monitors the light quantity when the laser diode LD is turned on by means of the second detection signal SP2 and adjusts the drive current for the laser diode LD so that the light quantity of the laser diode LD becomes a given light quantity set in advance.

Figure 5:
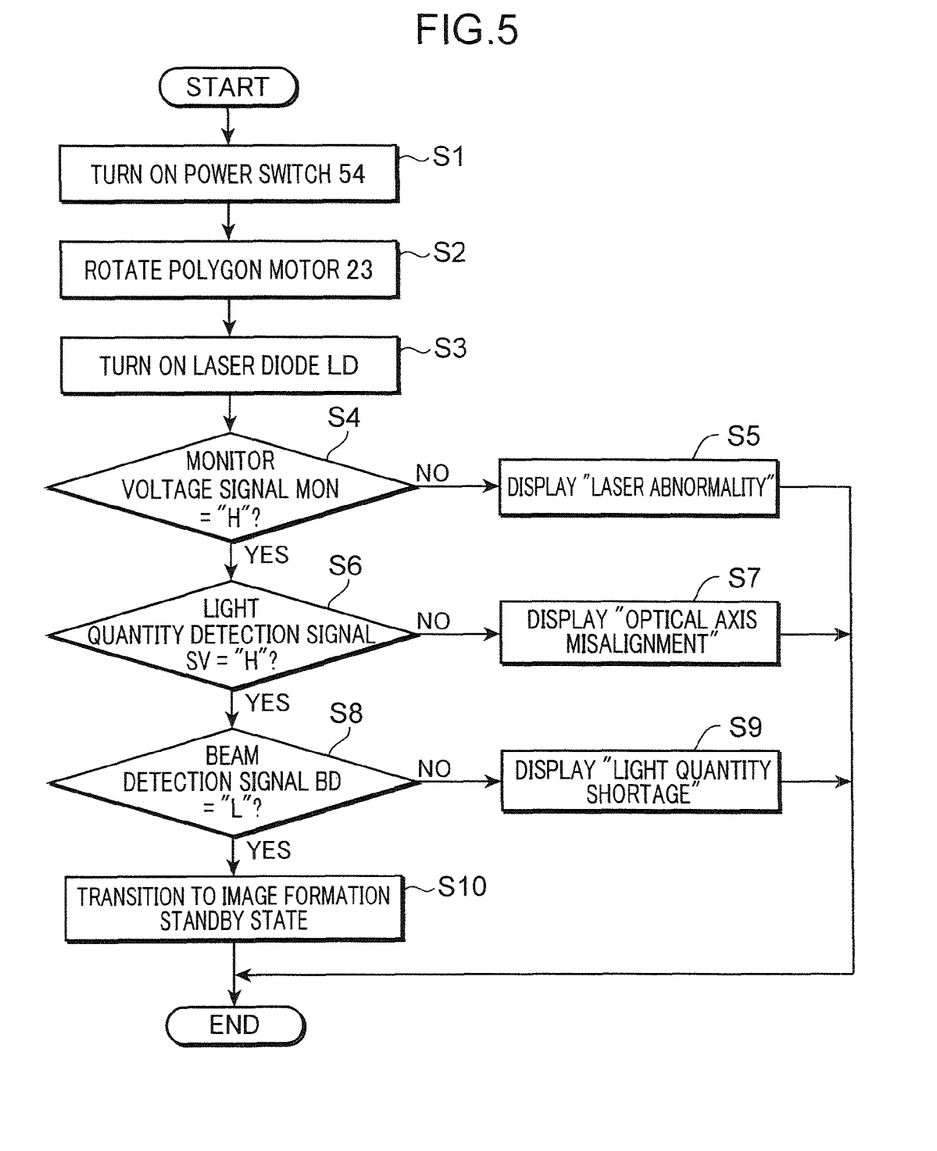
FIG. 5 is a flow chart showing an example of the operation of the optical scanning device shown in FIG. 4.

Next, the operation of the optical scanning device 42 thus configured is described. FIG. 5 is a flow chart showing an example of the operation of the optical scanning device 42 shown in FIG. 4. Further, the flow chart shown in FIG. 5 shows an abnormality detection method for the optical scanning device according to the present disclosure. First, when a user turns on the power switch 54 (Step S1), the copier 1 is activated and the copy controller 101 causes the polygon mirror 23 to start rotating (Step S2).

Subsequently, the copy controller 101 causes the APC 422 to start turning on the laser diode LD (Step S3). Then, a laser beam LB is scanned in the main scanning direction by the polygon mirror 22 if the laser diode LD is normally emitting light.

Subsequently, the determiner 111 checks whether or not the monitor voltage signal MON is at high-level (Step S4). If the monitor voltage signal MON is at low-level, i.e. the light quantity of the laser beam detected by the photodiode PD2 is below the light quantity corresponding to the third threshold voltage Vth3 (NO in Step S4), i.e. there is a high possibility that the laser diode LD is off, the determiner 111 judges an abnormal state in which the laser diode LD is off due to a failure or the like and causes the display unit 473 to display a message urging the user to request a repair to a service center run by the manufacturer of the copier 1 together with a message indicating the content of an abnormality, e.g. "laser abnormality" (abnormality of the light emitter) (Step S5) and finishes the process.

This enables the user to request a repair together with a failure content that the "laser abnormality" has occurred. As a result, a maintenance operator who repairs can prepare for a part corresponding to the failure content, e.g. a laser diode LD for replacement and a tool used to replace the laser diode LD and go to repair the failed copier 1, wherefore a maintenance operation can be smoothly performed.

According to this configuration, since the abnormality of the laser diode LD is determined by the determiner 111 if the light quantity indicated by the second detection signal SP2 is below the third threshold (third threshold voltage Vth3) set in advance (NO in Step S4), an abnormality in the scanning operation by the scanner and an abnormality of the light emitter can be discriminated.

On the other hand, the determiner 111 checks whether or not the light quantity detection signal SV is at high-level (Step S6) if the monitor voltage signal MON is at high-level, i.e. the light quantity of the laser beam detected by the photodiode PD2 is above the light quantity corresponding to the third threshold voltage Vth3 (YES in Step S4), i.e. the laser diode LD is on.

The determiner 111 determines an abnormality in the scanning operation, i.e. an "optical axis misalignment" such as a misalignment of a scanning position of the laser beam LB (NO in Step S6) if the light quantity detection signal SV is at low-level, i.e. the light quantity of the laser beam LB detected by the photodiode PD1 is below the light quantity corresponding to the second threshold voltage Vth2. Then, the determiner 111 causes the display unit 473 to display a message urging the user to request a repair to the service center run by the manufacturer of the copier 1 together with a message indicating the abnormality in the scanning operation, e.g. a message indicating an abnormality content, e.g. "optical axis misalignment" (Step S7) and finishes the process.

This enables the user to request a repair together with a failure content that the "optical axis misalignment" has occurred. As a result, a maintenance operator who repairs can prepare for a part corresponding to the failure content, e.g. a polygon mirror or an optical member for replacement or a tool used to adjust the optical path of the laser beam LB and go to repair the failed copier 1, wherefore a maintenance operation can be smoothly performed.

It is difficult to discriminate an abnormality in the scanning operation by the polygon mirror 22 (scanner) and an abnormality of the laser diode LD (light emitter) if only the first detection signal SP1 detected by the photodiode PD1 (first detector) is used. However, according to this configuration, the light quantity of a beam before being scanned by the polygon mirror 22 is detected as the second detection signal SP2 by the photodiode PD2 (second detector) arranged near the laser diode LD. Then, the determiner 111 can specify the abnormality in the scanning operation by the scanner if the light quantity indicated by the second detection signal SP2 is above the third threshold (third threshold voltage Vth3) (YES in Step S4) and the light quantity indicated by the first detection signal SP1 is below the second threshold (second threshold voltage Vth2) (NO in Step S6).

Figure 6:
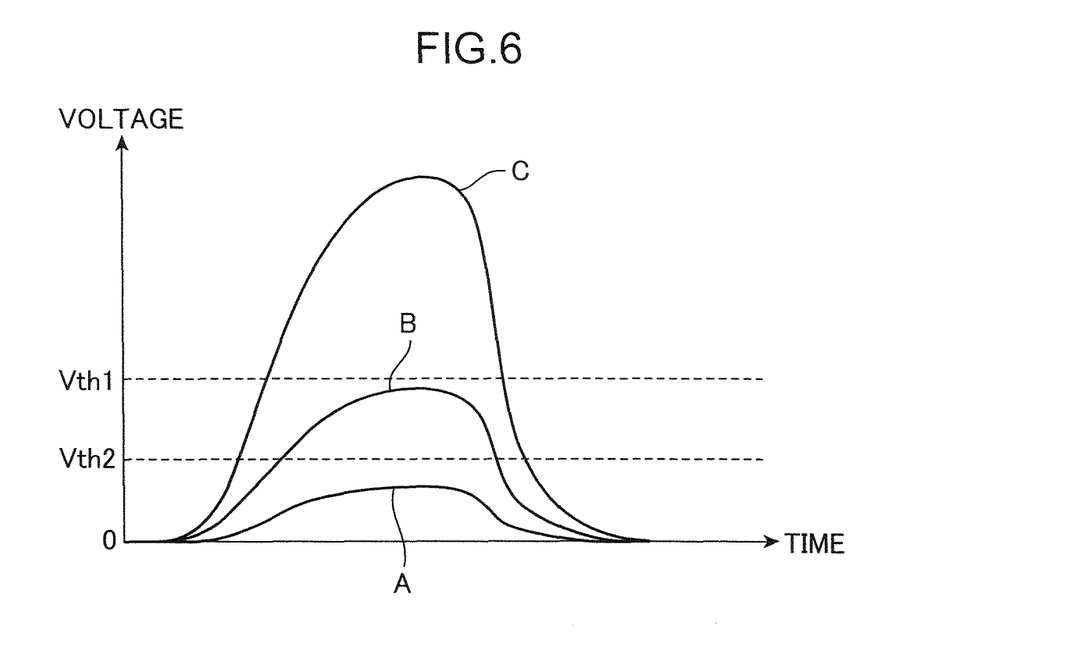
FIG. 6 is a graph showing examples of signal waveforms of a first detection signal obtained when a laser beam is detected by a first detector provided in the optical scanning device.

FIG. 6 is a graph showing examples of signal waveforms of the first detection signal SP1 obtained when the laser beam LB is detected by the photodiode PD1. If scanning by the laser beam LB is performed, the first detection signal SP1 in the form of a pulse as indicated by the signal waveform A, B or C of FIG. 6 is obtained at a timing at which the laser beam LB passes a light receiving surface of the photodiode D1 in every scanning cycle.

If the scanning position of the laser beam LB deviates, for example, due to a problem such as the inclination of the rotary shaft of the polygon mirror 22 or the deviation of the arrangement position of an optical member such as the unillustrated Fθ lens, a situation is brought about where the laser beam LB does not scan the center of the light receiving surface of the photodiode PD1 and slightly passes an end part of the light receiving surface of the photodiode PD1 or does not pass the light receiving surface of the photodiode PD1 at all. In such a case, a voltage level of a peak of the first detection signal SP1 becomes extremely low as shown by the signal waveform A of FIG. 6 or the first detection signal SP1 remains to be 0 V beyond the scanning cycle of the laser beam LB, with the result that the first detection signal SP1 continues to be below the second threshold voltage Vth2 for a period exceeding the scanning cycle of the laser beam LB and the light quantity detection signal SV becomes low-level.

Accordingly, if the monitor voltage signal MON is at high-level (YES in Step S4) and the light quantity detection signal SV is at low-level (continues to be at low-level for the period exceeding the scanning cycle of the laser beam LB) (NO in Step S6), the determiner 111 can determine that the "optical axis misalignment" has occurred.

Note that since the laser beam LB is scanned in the given scanning cycle by the polygon mirror 22 as described above, the photodiode PD1 can detect the laser beam LB only for a short period during which the laser beam LB passes the light receiving surface of the photodiode PD1 in one scanning cycle.

Accordingly, the first detection signal SP1 becomes a pulsed signal. Thus, the beam detection signal BD and the light quantity detection signal SV generated by the comparators CMP1, CMP2 based on the first detection signal SP1 also become pulsed signals.

Thus, the determiner 111 judges that the light quantity detection signal SV is at high-level, i.e. the light quantity of the laser beam LB has exceeded the light quantity corresponding to the second threshold voltage Vth2 if the light quantity detection signal SV becomes high-level even once in the scanning cycle and judges that the light quantity detection signal SV is at low-level, i.e. the light quantity of the laser beam LB is below the light quantity corresponding to the second threshold voltage Vth2 if the light quantity detection signal SV continues to be at low-level for a period of the scanning cycle.

Similarly, the determiner 111 judges that the beam detection signal BD is at low-level, i.e. the light quantity of the laser beam LB has exceeded the light quantity corresponding to the first threshold voltage Vth1 if the beam detection signal BD becomes low-level even once in the scanning cycle and judges that the beam detection signal BD is at high-level, i.e. the light quantity of the laser beam LB is below the light quantity corresponding to the first threshold voltage Vth1 if the beam detection signal BD continues to be at high-level for a period of the scanning cycle.

On the other hand, the determiner 111 confirms whether or not the beam detection signal BD is at low-level (Step S8) if the light quantity detection signal SV becomes high-level (if the light quantity detection signal SV has become high-level even once in the scanning cycle of the laser beam LB) (YES in Step S6), i.e. the light quantity of the laser beam LB detected by the photodiode PD1 has exceeded the light quantity corresponding to the second threshold voltage Vth2.

If the beam detection signal BD is at high-level (if the beam detection signal BD continues to be at high-level for a period exceeding the scanning cycle of the laser beam LB), the light quantity of the laser beam LB is below the light quantity corresponding to the first threshold voltage Vth1 and above the light quantity corresponding to the second threshold voltage Vth2 as shown by the signal waveform B of the first detection signal SP1 of FIG. 6.

Accordingly, the determiner 111 determines that the light quantity of the laser beam LB is insufficient (NO in Step S8) if the beam detection signal BD is at high-level (if the beam detection signal BD continues to be at high-level for the period exceeding the scanning cycle of the laser beam LB).

Then, the determiner 111 causes the display unit 473 to display a message urging the user to request a repair to the service center run by the manufacturer of the copier 1 together with a message indicating an insufficient light quantity of the laser beam LB, e.g. a message indicating an abnormality content, e.g. "light quantity shortage" (Step S9) and finishes the process.

This enables the user to request a repair together with a failure content that the "light quantity shortage" has occurred. Besides a reduction in the emission amount caused by characteristic deterioration of the laser diode LD, a possibility that the optical member such as the Fθ lens arranged on the optical path of the laser beam LB is smeared can be, for example, thought as a cause for the light quantity shortage of the laser beam LB. Thus, a maintenance operator who repairs can prepare for a cleaning tool for cleaning the smear of the optical member such as the Fθ lens besides a part corresponding to the failure content, e.g. a laser diode LD for replacement and go to repair the failed copier 1, wherefore a maintenance operation can be smoothly performed.

According to this configuration, the determiner 111 determines the light quantity shortage of the beam if the light quantity indicated by the first detection signal SP1 is above the second threshold (second threshold voltage Vth2) (YES in Step S6) and below the first threshold (first threshold voltage Vth1) (NO in Step S8), and an abnormality in the scanning operation by the scanner is determined if the light quantity indicated by the first detection signal SP1 is below the second threshold value. Thus, the abnormality content of the optical scanning device including the abnormality in the scanning operation can be determined in more detail.

On the other hand, the determiner 111 determines that the laser beam LB is normally scanned if the beam detection signal BD is at low-level (if the beam detection signal BD has become low-level even once in the scanning cycle of the laser beam LB) (YES in Step S8), and transitions to an image formation standby state where it is waited in a state capable of starting copying when a copy execution instruction is given by the user (Step S10), thereby finishing the abnormality detection process.

According to this configuration, since a normal state is determined by the determiner 111 if the light quantity indicated by the first detection signal SP1 exceeds the first threshold (first threshold voltage Vth1) (YES in Step S8), the state of the optical scanning device 42 can be determined in more detail.

Figure 7:
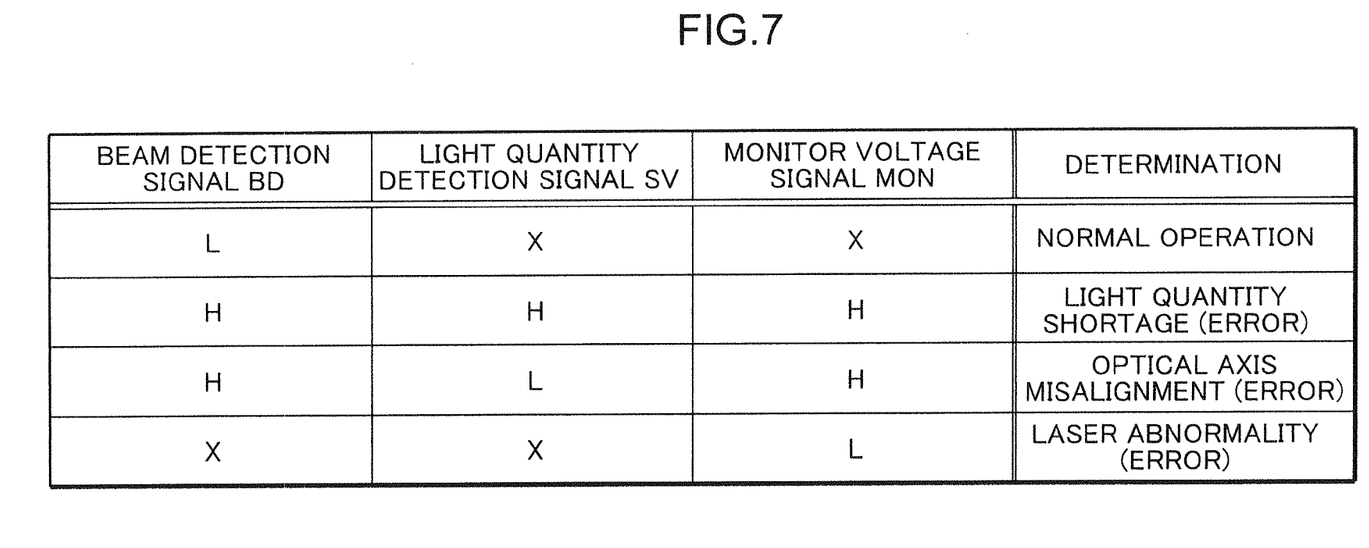
FIG. 7 is a truth table compiling abnormality determination conditions by a determiner provided in the optical scanning device in a table format.

FIG. 7 is a truth table compiling abnormality determination conditions by the determiner 111 in a table format. In FIG. 7, "L" denotes low-level, "H" denotes high-level and "X" denotes an arbitrary logic. As shown in FIG. 7, if the monitor voltage signal MON is at low-level, "laser abnormality" is determined regardless of the beam detection signal BD and the light quantity detection signal SV. If the beam detection signal BD is at low-level, "normal operation" is determined regardless of the light quantity detection signal SV and the monitor voltage signal MON. Further, when the beam detection signal BD and the monitor voltage signal MON are both at high-level, "light quantity shortage" is determined if the light quantity detection signal SV is at high-level and when the beam detection signal BD and the monitor voltage signal MON are both at high-level, "optical axis misalignment" is determined if the light quantity detection signal SV is at low-level.

As described above, the content of an abnormality having occurred in the optical scanning device 42 can be determined in more detail and a determination result can be notified to the user and the maintenance operator by the process of Steps S1 to S10.

Note that it is not always necessary to provide the photodiode PD2 and the comparator CMP3 and Steps S4, S5 may not be performed. In this case, the occurrence of "optical axis misalignment" or "laser abnormality" is determined in Step S7.

Further, if the beam detection signal BD is at low-level in Step S8 (YES in Step S8), it is not always necessary for the determiner 111 to determine that the laser beam LB is normally scanned and to transition to the image formation standby state (Step S10).

A correspondence between logic levels of the beam detection signal BD, the light quantity detection signal SV and the monitor voltage signal MON and the meanings of the signals is an example and a correspondence relationship between the logic levels and the meanings of the levels may be different.

Further, the comparison of the first and second detection signals SP1, SP2 with the first, second and third threshold voltages Vth1, Vth2 and Vth3 is made by the comparators CMP1, CMP2 and CMP3 in the above example. However, without using the comparators CMP1, CMP2 and CMP3, the first and second detection signals SP1, SP2 may be, for example, converted into digital values and these digital values and the first, second and third thresholds may be compared by the CPU.

What is claimed is:

1. An optical scanning device, comprising:
    a laser diode for outputting a beam;
    a scanner for scanning within a given area determined in advance with the beam output from the laser diode;
    a first detector arranged on an optical path of the beam in the given area and configured to detect the light quantity of the beam;
    a second detector configured to detect a light quantity of a back beam of the laser diode;
    a first comparator that compares a first detection signal indicating the light quantity detected by the first detector and a first threshold voltage that is a reference voltage for determination as to whether or not the beam has been normally detected, and outputs a beam detection signal, the beam detection signal being set to a first value when the first detection signal exceeds the first threshold voltage and, on the other hand, set to a second value when the first detection signal falls below the first threshold voltage,
    a second comparator that compares the first detection signal and a second threshold voltage smaller than the first threshold voltage, and outputs a light quantity signal, the light quantity signal being set to a third value when the first detection signal exceeds the second threshold voltage and, on the other hand, set to a fourth value when the first detection signal falls below the second threshold voltage,
    a third comparator that compares a second detection signal indicating the light quantity detected by the second detector and a third threshold voltage that is a reference voltage for determination as to whether or not the laser diode has emitted the beam, and outputs a monitor voltage signal, the monitor voltage signal being set a fifth value when the second detection signal exceeds the third threshold voltage and, on the other hand, set to a sixth value when the second detection signal falls below the third threshold voltage, and
    a determiner for determining an abnormality of the optical scanning device based on the beam detection signal, the light quantity signal and the monitor voltage signal, wherein
    the determiner determines:
        a normal state when the beam detection signal is the first value,
        a laser diode abnormality not to emit the beam when the monitor voltage signal is the sixth value,
        a light quantity shortage abnormality of the laser diode when the beam detection signal is the second value, the light quantity signal is the third value and the monitor voltage signal is the fifth value, and
        an optical axis misalignment abnormality when the beam detection signal is the second value, the light quantity signal is the fourth value and the monitor voltage signal is the fifth value.

2. An image forming apparatus, comprising:
    an optical scanning device according to claim 1;
    a photoconductor arranged in the given area and configured to be scanned by the beam to form an electrostatic latent image;
    an imager for forming an image on a sheet based on the electrostatic latent image formed on the photoconductor; and
    a notifier for providing notification of the message generated by the determiner.

* * * * *